US012460449B2

(12) United States Patent
Mantena et al.

(10) Patent No.: US 12,460,449 B2
(45) **Date of Patent: *Nov. 4, 2025**

(54) CONTROLLABLE DOOR LOCK

(71) Applicant: JANUS INTERNATIONAL GROUP, LLC, Temple, GA (US)

(72) Inventors: Rajiv Mantena, Salt Lake City, UT (US); David Gengler, Draper, UT (US); Jacob Gosling, Eagle Mountain, UT (US)

(73) Assignee: Janus International Group, LLC, Temple, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,349

(22) Filed: Jan. 2, 2024

(65) Prior Publication Data

US 2024/0167300 A1 May 23, 2024

Related U.S. Application Data

(63) Continuation of application No. 18/056,300, filed on Nov. 17, 2022, now Pat. No. 11,879,271, which is a (Continued)

(51) Int. Cl.

*E05B 65/00* (2006.01)
*E05B 47/00* (2006.01)

(Continued)

(52) U.S. Cl.

CPC ...... *E05B 65/0021* (2013.01); *E05B 47/0012* (2013.01); *E05B 47/0607* (2013.01);

(Continued)

(58) Field of Classification Search

CPC ................. E05B 47/06; E05B 47/0607; E05B 2047/0084; E05B 2047/0085; E05B 55/00;

(Continued)

(56) References Cited

U.S. PATENT DOCUMENTS 4,784,415 A 11/1988 Malaval
5,287,710 A 2/1994 James (Continued)

FOREIGN PATENT DOCUMENTS

JP H04167094 A 6/1992
JP H08151833 A 6/1996

(Continued)

OTHER PUBLICATIONS

International Preliminary Report on Patentability; International Patent Application No. PCT/US2020/047657; Feb. 17, 2022.

(Continued)

*Primary Examiner* — Christopher J Boswell
(74) *Attorney, Agent, or Firm* — Barnes & Thornburg LLP

(57) ABSTRACT

A storage lock for a storage door, the lock comprising a lock housing for mounting to the storage door or a storage frame supporting the door; and a lock mechanism arranged within the lock housing, the lock mechanism comprising a latch selectively operable between a locked position in which the latch is extended to engage with the other of the storage door and storage frame to block against opening of the storage door, and an unlocked position in which the latch is retracted to disengage from the other of the storage door and storage frame to allow the storage door to be opened for access to storage, and a latch control system selectively operable between a restricted position to block against operation of the latch out from the locked position, and an unrestricted position to permit operation of the latch out from the locked position to the unlocked position.

19 Claims, 6 Drawing Sheets

Related U.S. Application Data continuation of application No. 17/001,344, filed on Aug. 24, 2020, now Pat. No. 11,505,967.

(60) Provisional application No. 62/890,448, filed on Aug. 22, 2019.

(51) Int. Cl.

| | |
|---|---|
| ***E05B 47/06*** | (2006.01) |
| ***E05B 55/00*** | (2006.01) |
| ***E05B 55/12*** | (2006.01) |
| ***E05B 65/08*** | (2006.01) |

(52) U.S. Cl.

CPC .............. *E05B 55/00* (2013.01); *E05B 55/12* (2013.01); *E05B 65/08* (2013.01); *E05B 65/0864* (2013.01); *E05B 2047/0084* (2013.01); *E05B 2047/0094* (2013.01); *E05Y 2201/434* (2013.01); *E05Y 2201/47* (2013.01); *E05Y 2400/85* (2013.01); *E05Y 2900/106* (2013.01)

(58) Field of Classification Search

CPC .... E05B 55/005; E05B 55/12; E05B 65/0021; E05B 65/0028; E05B 65/02; E05B 65/06; E05B 65/08; E05B 65/0864; E05B 65/087

See application file for complete search history.

(56) References Cited

U.S. PATENT DOCUMENTS

| | | | | |
|---|---|---|---|---|
| 6,462,431 | B1 * | 10/2002 | Woo | E05B 47/0603 307/142 |
| 7,032,418 | B2 | 4/2006 | Martin | |
| 7,350,383 | B1 | 4/2008 | Kuo | |
| 7,520,152 | B2 * | 4/2009 | Sabo | E05B 63/18 292/144 |
| 8,814,233 | B2 * | 8/2014 | Leska | F16P 3/10 292/144 |
| 10,400,472 | B2 * | 9/2019 | Schultz | E05B 65/0014 |
| 10,519,692 | B1 * | 12/2019 | Baird | E05B 55/12 |
| 10,724,277 | B2 * | 7/2020 | Baker | E05B 63/044 |
| 10,968,660 | B2 | 4/2021 | Maiga | |
| 11,170,597 | B2 | 11/2021 | Roper | |
| 11,214,986 | B2 * | 1/2022 | Emma | E05B 55/005 |
| 11,505,967 | B2 * | 11/2022 | Mantena | E05B 55/00 |
| 11,512,498 | B2 * | 11/2022 | Haagendrup | E05B 47/0002 |
| 11,879,271 | B2 * | 1/2024 | Mantena | E05B 55/12 |
| 11,920,378 | B2 * | 3/2024 | Barnett, III | E05B 47/0607 |
| 12,146,345 | B2 * | 11/2024 | Chiti | E05B 65/48 |
| 2003/0206104 | A1 * | 11/2003 | Lowry | E05B 45/12 340/545.1 |
| 2005/0235711 | A1 | 10/2005 | Martin et al. | |
| 2008/0236214 | A1 | 10/2008 | Han | |
| 2010/0180511 | A1 | 7/2010 | Mahdi | |
| 2010/0270816 | A1 | 10/2010 | Yuan | |
| 2013/0192319 | A1 | 8/2013 | Lambrou et al. | |
| 2014/0183881 | A1 | 7/2014 | Armari et al. | |
| 2015/0115629 | A1 * | 4/2015 | Gartner | E05B 65/0082 292/220 |
| 2015/0225983 | A1 | 8/2015 | Alzingre | |
| 2021/0348421 | A1 | 11/2021 | Haagendrup | |
| 2022/0042349 | A1 | 2/2022 | Barnett, III | |
| 2022/0049525 | A1 * | 2/2022 | Luebeck | E05B 65/0021 |
| 2023/0304319 | A1 * | 9/2023 | Kuenzi | E05B 39/04 |
| 2024/0141697 | A1 * | 5/2024 | Gengler | E05B 65/0021 |

FOREIGN PATENT DOCUMENTS

| | | | |
|---|---|---|---|
| JP | 2007051443 | A | 3/2007 |
| JP | 2007102274 | A | 4/2007 |
| KR | 20190036583 | A | 4/2019 |

OTHER PUBLICATIONS

International Search Report and Written Opinion; International Patent Application No. PCT/US2020/047657; Dec. 4, 2020.

Office Action; Canadian Patent Application No. 3,152,019; Dec. 12, 2023.

Decision of Rejection; Japanese Patent Application No. 2022-511369; May 28, 2024.

Office Action (Notice of Reasons for Refusal); Japanese Patent Application No. 2024-066450; Mar. 4, 2025.

Search Report in MY Application No. PI2022000963, issued Jun. 27, 2025.

* cited by examiner

CONTROLLABLE DOOR LOCK

PRIORITY CLAIM

This application is a continuation of U.S. patent application Ser. No. 18/056,300, filed Nov. 17, 2022, which is a continuation of U.S. patent application Ser. No. 17/001,344, filed Aug. 24, 2020, which claims priority under 35 U.S.C. § 119(e) to U.S. Provisional Application Ser. No. 62/890, 448, filed Aug. 22, 2019, the disclosures of which are expressly incorporated by reference herein in their entirety.

FIELD

The present disclosure relates generally to devices, systems, and methods for locking, and more particularly to devices, systems, and methods for door locking.

BACKGROUND

Physical security, for example, for storage facilities can present interesting challenges for appropriate access to the storage. For security storage doors which can require access by a various parties, maintaining permissions to access the secured storage can be cumbersome. For example, in owner-tenant relationships, access and/or infrastructure to support access can be complex.

SUMMARY

According to an aspect of the present disclosure, a storage lock for a storage door, the storage lock may include a lock housing for mounting to one of the storage door or a storage frame supporting the storage door; and a lock mechanism arranged within the lock housing. The lock mechanism may include a latch selectively operable between a locked position in which the latch is extended to engage with the other of the storage door and storage frame to block against opening of the storage door, and an unlocked position in which the latch is retracted to disengage from the other of the storage door and storage frame to allow the storage door to be opened for access to storage, and a latch control system selectively operable between a restricted position to block against operation of the latch out from the locked position, and an unrestricted position to permit operation of the latch out from the locked position to the unlocked position.

In illustrative embodiments, the latch control system may include a controller and a latch operator. The controller may be configured to issue instructions to the latch operator to selectively arrange a key between the restricted position to block against operation of the latch out from the locked position, and the unrestricted position to permit operation of the latch out from the locked position to the unlocked position. In illustrative embodiments, the controller may include a processor for execution of instructions stored on a memory for issuing commands to the latch operator for selective operation, based on user input.

In illustrative embodiments, the latch control system may include a key selectively operable between blocked and unblocked positions corresponding with the restricted and unrestricted positions of the latch control system. In the blocked position, the key may be arranged to engage the latch to block movement of the latch out from the locked position to the unlocked position, and in the unblocked position the key may be arranged disengaged from the latch to permit movement of the latch out from the locked position to the unlocked position. In the blocked position, the key may be arranged within an opening of the latch to block movement of the latch out from the locked position. In illustrative embodiments, the key may be arranged as a pivotable member operable to pivot one end into engagement with the latch in the blocked position.

In illustrative embodiments, the latch control system may include a restrictor selectively operable between restricted and unrestricted positions. In the restricted position, the restrictor may be arranged to engage the key to block movement of the key out from the blocked position. The restrictor may be formed as a slider for linear movement between the restricted and unrestricted positions. In illustrative embodiments, the key may be pivotable between blocked and unblocked positions, and the restrictor may be arranged to block pivoting of the key out of the blocked position in the restricted position.

In illustrative embodiments, in the unrestricted position, the restrictor may be arranged disengaged from the key to permit movement of the key out from the blocked position to the unblocked position. The latch control system may include a latch operator for driving movement of the restrictor between the restricted and unrestricted positions. The latch operator may include an actuator and a resilient connector engaged between the actuator and the restrictor to transmit actuation force from the actuator to the restrictor.

The resilient connector may be selectively operable between a contracted position and an extended position. The actuator may be selectively operable to apply a restriction force to the resilient connector to bias the restrictor towards the restricted position. In illustrative embodiments, the resilient connector may be formed as a linear spring.

In illustrative embodiments, under the restriction force with the blocked position of the key, the resilient connector may be driven to bias the restrictor into the restricted position while the restrictor remains in the unrestricted position. Under the restriction force with the unblocked position of the key, the resilient connector may be driven to bias the restrictor into the restricted position to move the restrictor towards the restricted position.

According to another aspect of the present disclosure, a storage security door system may include a storage security door including a door and a frame; and a lock secured with one of the door and the frame. The lock may include a latch selectively operable between a locked position in which the latch is engaged with the other of the door and the frame to block against opening of the door, and an unlocked position in which the latch is disengaged from the other of the door and the frame to allow the storage security door to be opened for access to storage, and a latch control system selectively operable between a restricted position to block against operation of the latch out from the locked position, and an unrestricted position to permit operation of the latch out from the locked position to the unlocked position.

In illustrative embodiments, the latch control system may include a controller configured to issue instructions to the latch operator to selectively arrange a key between the restricted position to block against operation of the latch out from the locked position, and the unrestricted position to permit operation of the latch out from the locked position to the unlocked position. The controller may include a processor for execution of instructions stored on a memory for issuing commands to the latch operator for selective operation, based on user input. The controller may be operable to communicate with a network to permit remote communication for governing operation of the latch control system between the restricted and unrestricted positions.

In illustrative embodiments, the latch control system may include a key operable between blocked and unblocked positions. In the blocked position the key may be arranged to engage the latch to block movement of the latch out from the locked position to the unlocked position, and in the unblocked position the key may be arranged disengaged from the latch to permit movement of the latch out from the locked position to the unlocked position. In illustrative embodiments, the latch control system may include a restrictor selectively operable between restricted and unrestricted positions. In the restricted position, the slider may be arranged to engage the key to block movement of the key out from the blocked position.

BRIEF DESCRIPTION OF THE DRAWINGS

The drawings disclose exemplary embodiments in which like reference characters designate the same or similar parts throughout the figures of which.

DETAILED DESCRIPTION

Figure 1:
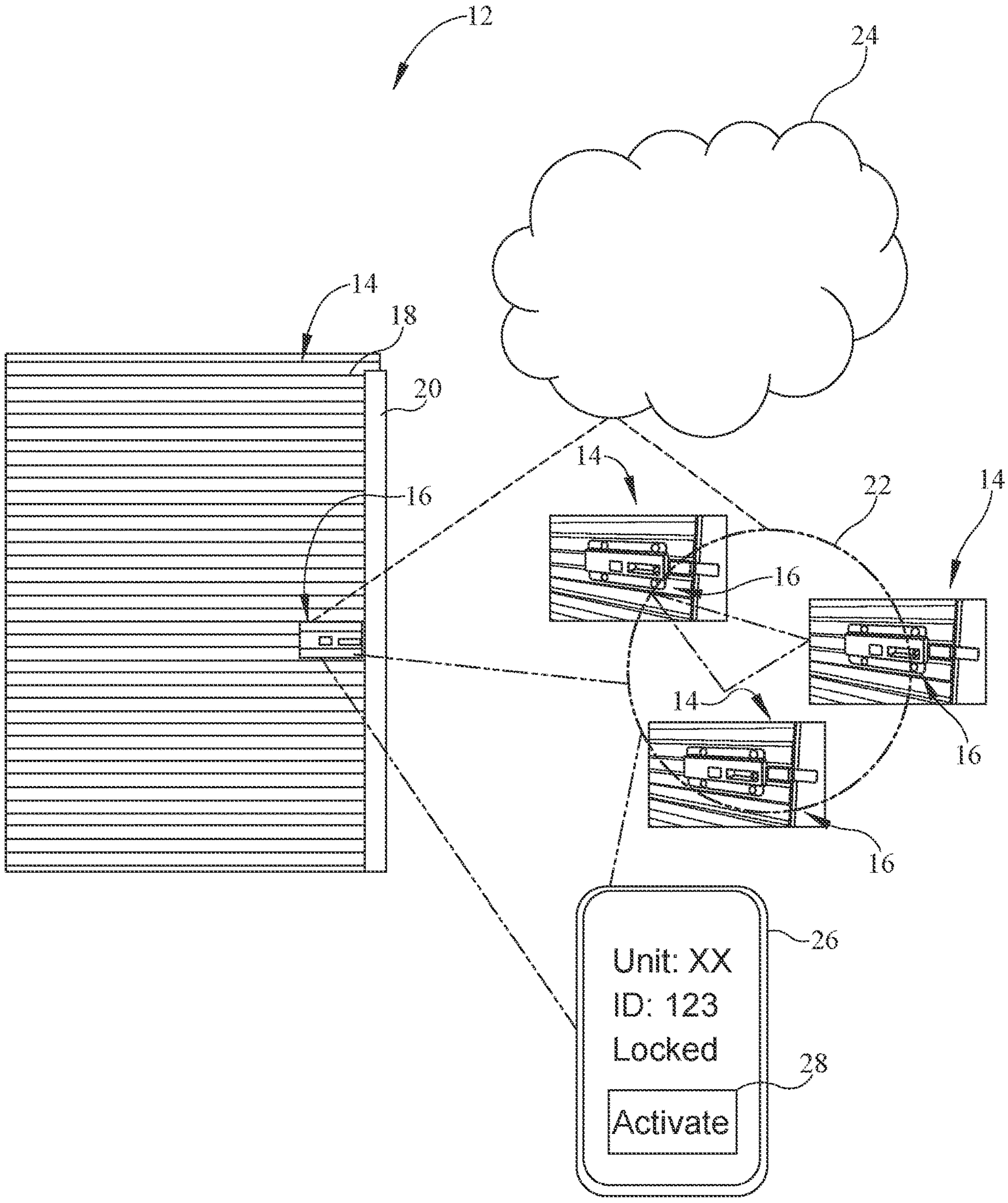
FIG. 1 is a diagrammatic view of a security door system in accordance with certain aspects of the present disclosure.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Physical security, for example, for storage facilities can present interesting challenges for appropriate access to the storage. One example can include rental storage facilities which may rent or lease storage units to users (tenants/lessees), the units being individualized storage rooms that can be secured for each individual tenant. Challenges can arise in providing selective access to the storage units.

In traditional rental storage facilities, the user (lessee) of a storage unit can generally require access to the storage at will, but the owner (lessor) of the storage facility may need to maintain overriding or umbrella control of access to each storage unit. For example, the owner may require overriding control in order to lock out a user from access to the storage unit who has not paid according to their contractual agreement. Yet, manual provision of overriding control for access to storage units can be cumbersome and/or can require individualized governing controls for each storage unit. Storage facilities may have many tens, hundreds, or even thousands of individualized storage units which can each face such security challenges.

Referring now to FIG. 1, a security door system 12 is shown, embodied as an access door to an enclosed space for managing access to storage within the space. The security door system 12 illustratively includes a security door 14 and a lock mechanism 16 for selective operation to block against opening of the security door 14. The security door 14 is illustratively embodied to include as a corrugated roll-up door 18 having the lock mechanism 16 mounted thereto, but in some embodiments, may include any suitable manner of security door. The security door 14 includes a frame 20 that is configured to be connected with the building structure of the storage unit to remain stationary relative to the door 18 itself, and with which the lock mechanism 16 can selectively engage to block opening of the door 18. In illustrative embodiments, the lock mechanism may be mounted with the frame 20 and selectively engageable with the door 18.

The lock mechanism 16 is illustratively arranged in communication with other lock mechanisms 16 which may be arranged to operate with other security doors 14, for example, other security doors 14 for different storage units of the same storage facility. The lock mechanisms 16 are illustratively arranged in communication with each other by forming a mesh network 22. The mesh network 22 is illustratively embodied to be configured in a partially connected mesh topology indicating that some lock mechanisms may be physically out of direct communication with others but may adaptably form a fully connected meshnet according to the particular arrangements, but in some embodiments, the mesh network 22 may have any suitable topology, including but without limitation, ring, star, tree, line, and/or combinations thereof. The lock mechanism 16 is illustratively arranged in communication with a remote network 24, which may be embodied as the internet. Communication between the lock mechanism 16 and the remote network 24 is embodied to be provided via the mesh network 22, but in some embodiments, may be provided directly from individual lock mechanisms 16. The lock mechanism 16 is arranged in communication with a personal mobile device 26, embodied as a smart phone. Communications with the mesh network 22, and communications between the lock mechanism 16 and the personal mobile device 26, are illustratively provided via low power Bluetooth, but in some embodiments may include any suitable manner of wireless communications, including but without limitation, infrared, radio frequency, Wi-Fi, Zigbee, 3G/4G/5G, and the like.

Communication between lock mechanism 16 and personal mobile device 26 can permit the user to activate the lock mechanism 16, for example, to selectively lock and unlock the security door 14. A user in proximity with the security door 14 may access a menu, based on prior authorization, and may select an activation button 28 to operate the lock mechanisms between an unrestricted state to release a latch for selective movement to unlock the door, and a restricted state maintaining the latch in a locked position, as discussed in additional detail herein. The user may enter and/or confirm identifying information such as Unit number, user identification information, to ensure authorization for operation of the particular security door 14. An owner of the security door 14 may remotely access the lock mechanism 16 via the remote network, as discussed in additional detail herein.

Figure 2:
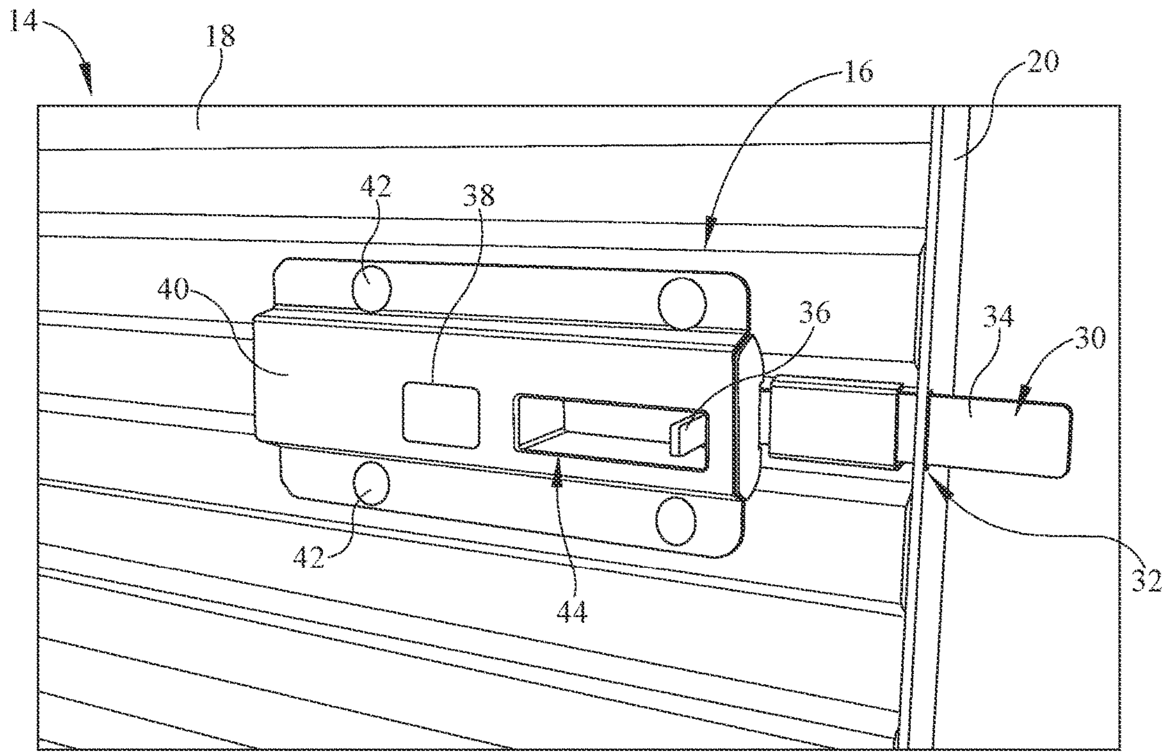
FIG. 2 is a perspective view of a lock mechanism of the security door system of FIG. 1 arranged in a locked position.

As shown in FIG. 2, in one exemplary embodiment the lock mechanism 16 includes a latch 30 arranged in a locked position, extending from a housing 40 by a first length to engage with the frame 20 of the security door 14 by penetration into an opening 32 in the frame 20. As discussed in additional detail herein, the lock mechanism 16 is secured with the door 18 such that positioning of the latch 30 within the opening 32 obstructs opening of the door 18 by blocking against vertical movement of the door 18 relative to the frame 20 for opening.

In exemplary embodiments, the latch 30 includes a latch body 34 and an arm 36 extending out from the latch body 34 for engagement with the user's hand. The arm 36 provides a physical handle for engagement with the user's hand or finger to slide the latch 30 between locked and unlocked positions. The lock mechanism 16 illustratively include a user interface 38 for activation to communicate with the lock mechanism 16. The user interface 38 is illustratively embodied as a touch sensitive pad for receiving contact with the user's finger for input of commands, for example, by a predetermined series of long and/or short time presses. The user interface 38 may include selective illumination as feedback response, for example, as feedback to user touch to communicate the received touch inputs back to the user and/or as feedback indicating successful and/or unsuccessful change between restricted and unrestricted states by a series of confirming flashes with or without color (such as, but not limited to, green for success, red for failure).

Figure 3:
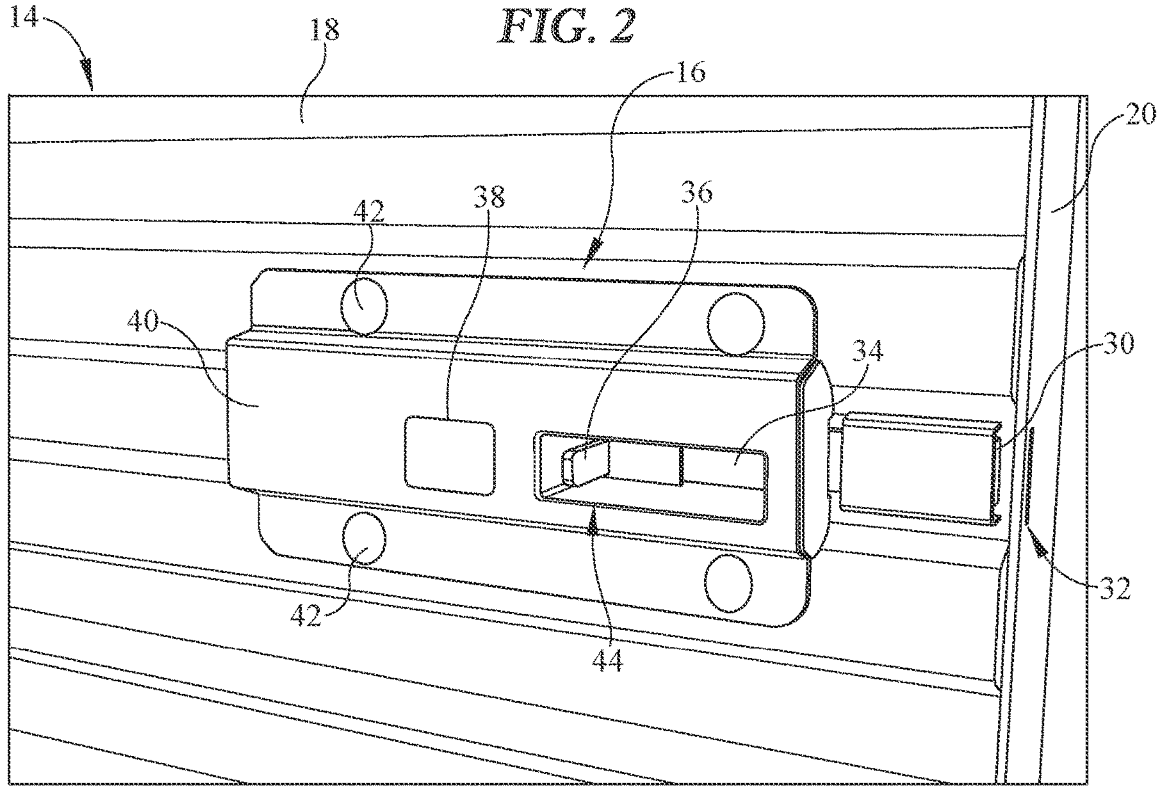
FIG. 3 is a perspective view of a lock mechanism of the security door system of FIG. 2 arranged in an unlocked position.

Referring to FIG. 3, the latch 30 is arranged in the unlocked position, extending from the housing 40 by a second length less than the first length, and disengaged from the opening 32 of the frame. The lock mechanism 16 illustratively includes the housing 40 which is secured with the door 18 by bolts 42 extending through the door 18 and secured by fastening nuts on the interior (secure) side of the door. The housing 40 is illustratively embodied to have a contoured shape with bolt flanges for conforming engagement with the corrugated form of the door 18, although in some embodiments, the housing 40 may take any suitable shape for securing the lock mechanism with the door 18. The housing 40 defines an internal space for arranging components of the lock mechanism 16. The housing 40 includes an opening 44 on a front side for receiving the arm 36 therethrough for engagement by the user's hand for movement to drive the latch body 34 between the locked and unlocked positions.

Figure 4:
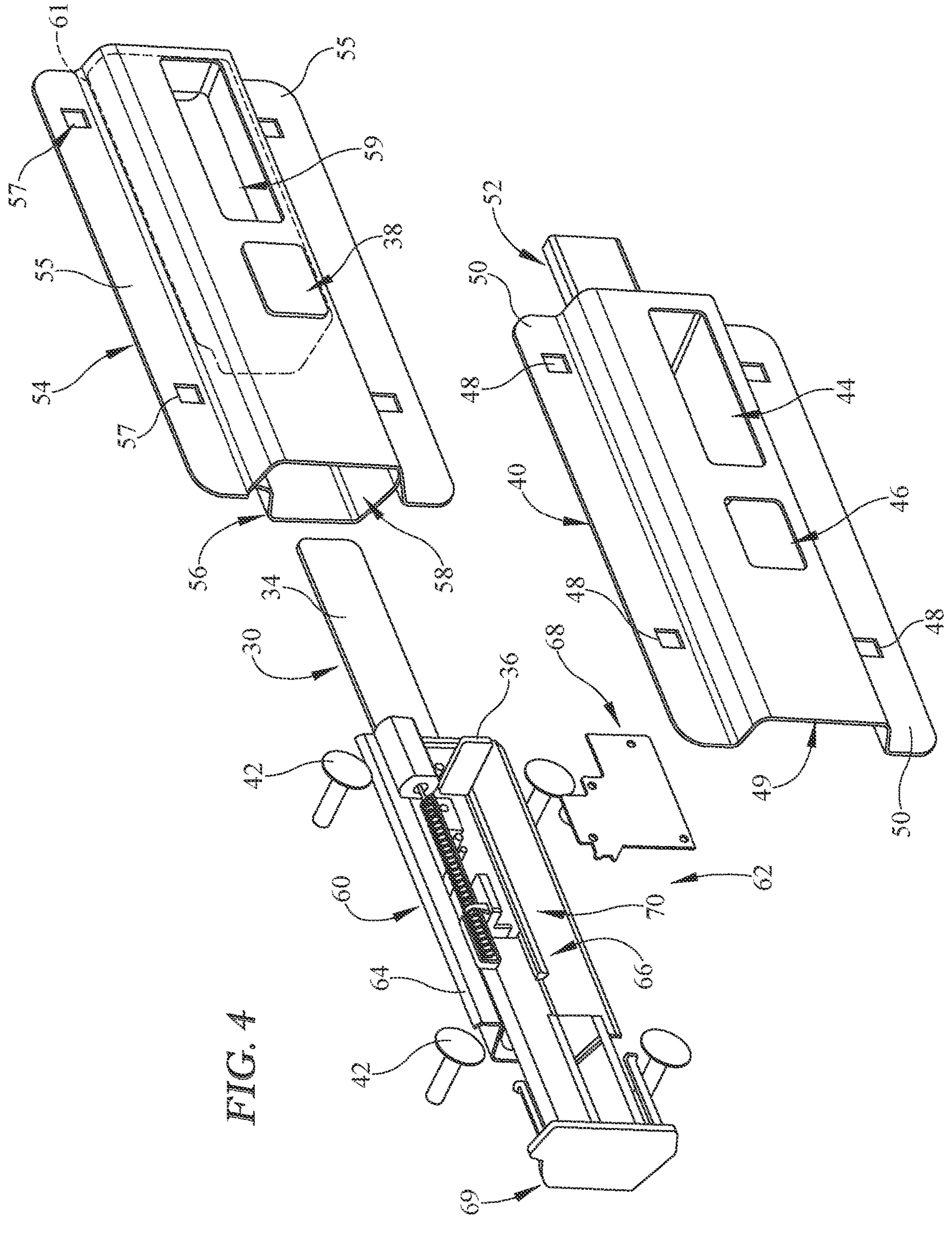
FIG. 4 an exploded perspective view of the lock mechanism of the security door system of FIGS. 1-3.

Referring now to FIG. 4, the housing 40 may include an interface opening 46 for receiving the user interface 38 therethrough for user access, and a number of fastener openings 48 arranged on the bolt flanges 50 for securing the housing 40 with the door 18. The housing 40 includes a latch support 52 extending from a lateral end and receiving the latch 30 to slidingly extend therethrough for selective engagement with the frame 20. The housing 40 includes an outer body 49 having a U-shaped cross-section connecting on opposite ends with each of the flanges 50.

The housing 40 includes a sleeve 54 having a sleeve body 56 and bolt flanges 55 having fastener openings 57 for receiving the bolts 42. The sleeve body 56 includes a front side formed complimentary with the outer body 49 and a rear side formed complimentary with the grooves of the corrugated door for complimentary fit therewith. The sleeve body 56 includes the user interface 38 and defines an opening 59 for the arm 36 of the latch 30. The sleeve 54 defines an internal opening 58 for receiving an end stopper 69 to enclose the internal opening 58.

The sleeve 54 includes a casing 60 which houses a latch control system 62. The casing 60 includes a casing body 64 for securing with the open rear of the sleeve 54 (indicated by broken line 61 in FIG. 4) to define an extended portion of the sleeve body 56. The casing 60 includes an internal cavity 66 with an open face for engagement with the rear of the sleeve 54 to enclose portions of the latch control system 62. The latch control system 62 includes a controller 68 and a latch operator 70 for selectively restricting movement of the latch 30 according to commands of the controller 68. The driver 72 and/or controller 68 illustratively receive power from an onboard battery, although in some embodiments, hardwired power may be provided from the storage facility.

Figure 5:
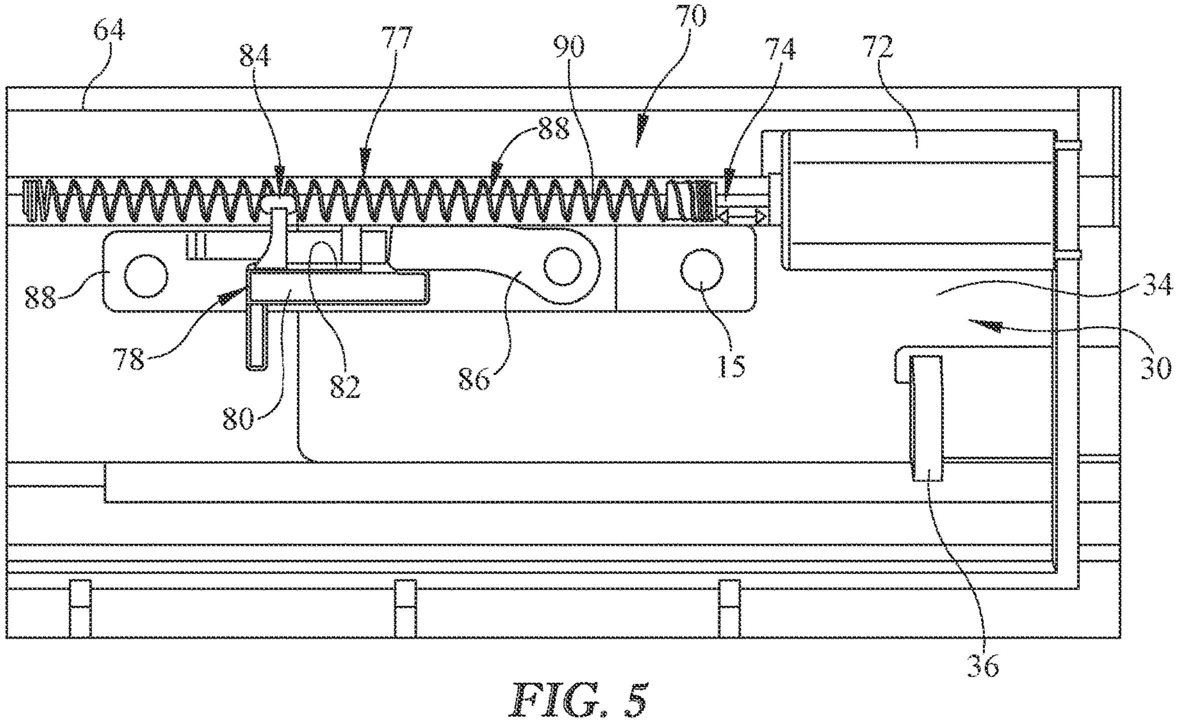
FIG. 5 is side elevation view of internal portions of the lock mechanism of FIGS. 2-4 arranged in the locked position.

Referring to the illustrative embodiment of FIG. 5, the latch operator 70 is shown closer for descriptive ease. The latch operator 70 includes a driver 72 illustratively embodied as an electric rotary actuator, but in some embodiments, may be any suitable manner of actuator, such as a linear actuator. The driver 72 includes an actuator arm 74 having a spring 77 formed as a coil and extending therefrom to resiliently transfer rotary actuation force from the actuator arm 74 to drive linear movement of a slider 78. The spring 77 is engaged with the slider 78 that is arranged for sliding movement relative to the casing body 64 to selectively restrict movement of the latch 30 out from the locked position. Rotary motion of the spring 77 drives the slider 78 for linear motion.

The slider 78 includes a body 80 having an upper surface 82. The slider 78 includes an arm 84 extending upward from the surface 82 for engagement with the spring 77 to receive rotary driven motion from the spring 77 to drive translation of the slider 78. In FIG. 5, the slider 78 is shown in a restricted position (rightward) in which the upper surface 82 blocks movement of a lock key 86 out from engagement with the latch 30 to restrict the latch 30 from moving out of the locked position.

The lock key 86 is illustratively secured with the casing 60 via strut 88 to remain stationary relative to the movement of the latch 30 between locked and unlocked positions. The lock key 86 is pivotable about the pin axis 15 of the strut 88 and is biased by a spring into the upwardly angled position referred to as the blocked position as shown in FIG. 5. With the slider 78 in the restricted position (rightward), the surface 82 blocks counterclockwise rotation of the lock key 86 out from the blocked position. In the blocked position of the lock key 86, the lock key 86 extends into an opening 89 in an arm 90 of the latch 30 to restrict movement of the latch 30 (leftward) out from the locked position.

Figure 6:
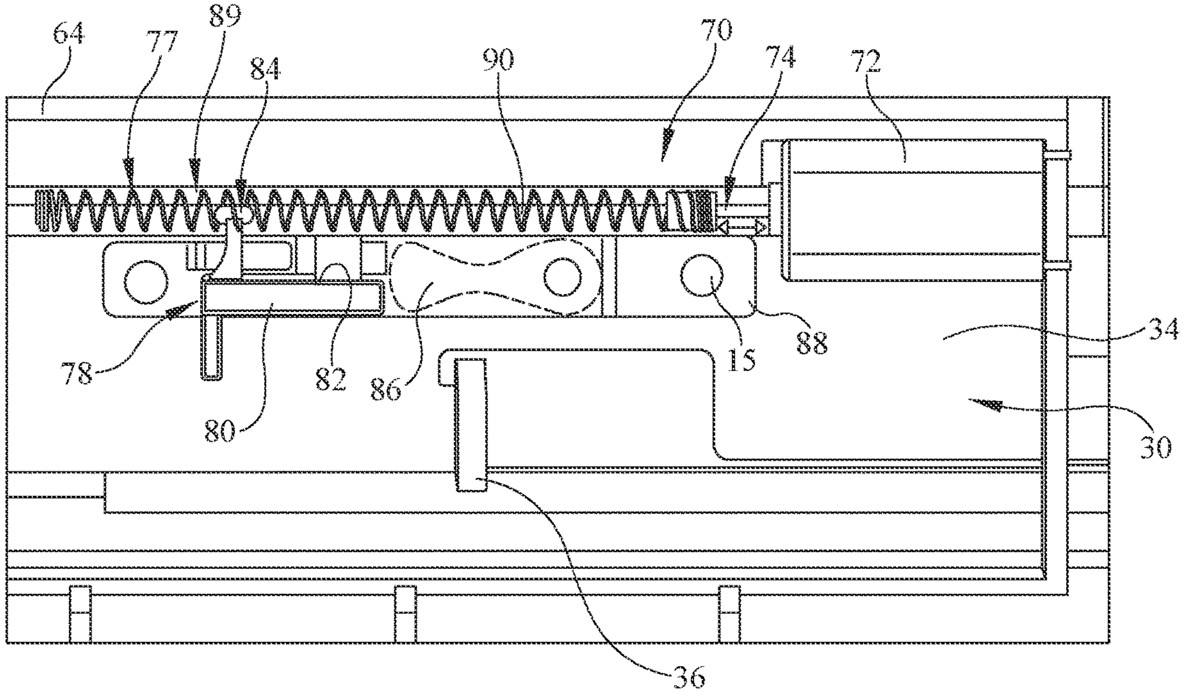
FIG. 6 is side elevation view of internal portions of the lock mechanism of FIG. 5 arranged in the unlocked position.

Referring now to FIG. 6, the slider 78 has been driven by the driver 72 leftward into an unrestricted position to release the lock key 86 for movement into an unblocked position disengaged from the latch 30. In the unblocked position, the lock key 86 (shown in broken line) has been rotated counterclockwise by the latch 30 under the user's force moving the latch 30 to the unlocked position (leftward). In the unblocked position of the lock key 86, the opening 89 is out of association with the lock key 86, and the lock key 86 is disengaged with the latch 30, to allow the latch 30 to be shifted leftward out from the locked position into the unlocked position of FIG. 6. The user may slide the latch 30 rightward into the locked position, which likewise arranges the opening 89 into association with the lock key 86 to allow the lock key 86 to be biased to rotate into the blocked position within the opening 89, to restrict movement of the latch 30 leftward. Once the lock key 86 is rotated into the blocked position (as shown in FIG. 5), the slider 78 can be shifted rightward into the restricted position, preventing rotation of the lock key 86 counterclockwise out from the blocked position, and thus restricting the latch 30 from movement out of the locked position.

The resilient nature of the spring 77 can allow the driver 72 to move the arm 74 to apply a driving force (rightward)

to the slider 78 to bias the slider 78 towards the restricted position even when the lock key 86 is disengaged from the latch 30 in the unblocked position, as in FIG. 6. Thus, when the lock key 86 is in the unblocked position latch 30 and the latch 30 is first in the unlocked position, the driver 72 can retract the arm 74 to create a rightward biasing force on the slider 78; and subsequently, when the user moves the latch 30 into the locked position, the resiliency of the spring 77 moves the slider 78 into the locked position to block rotation of the lock key 86.

Figure 7:
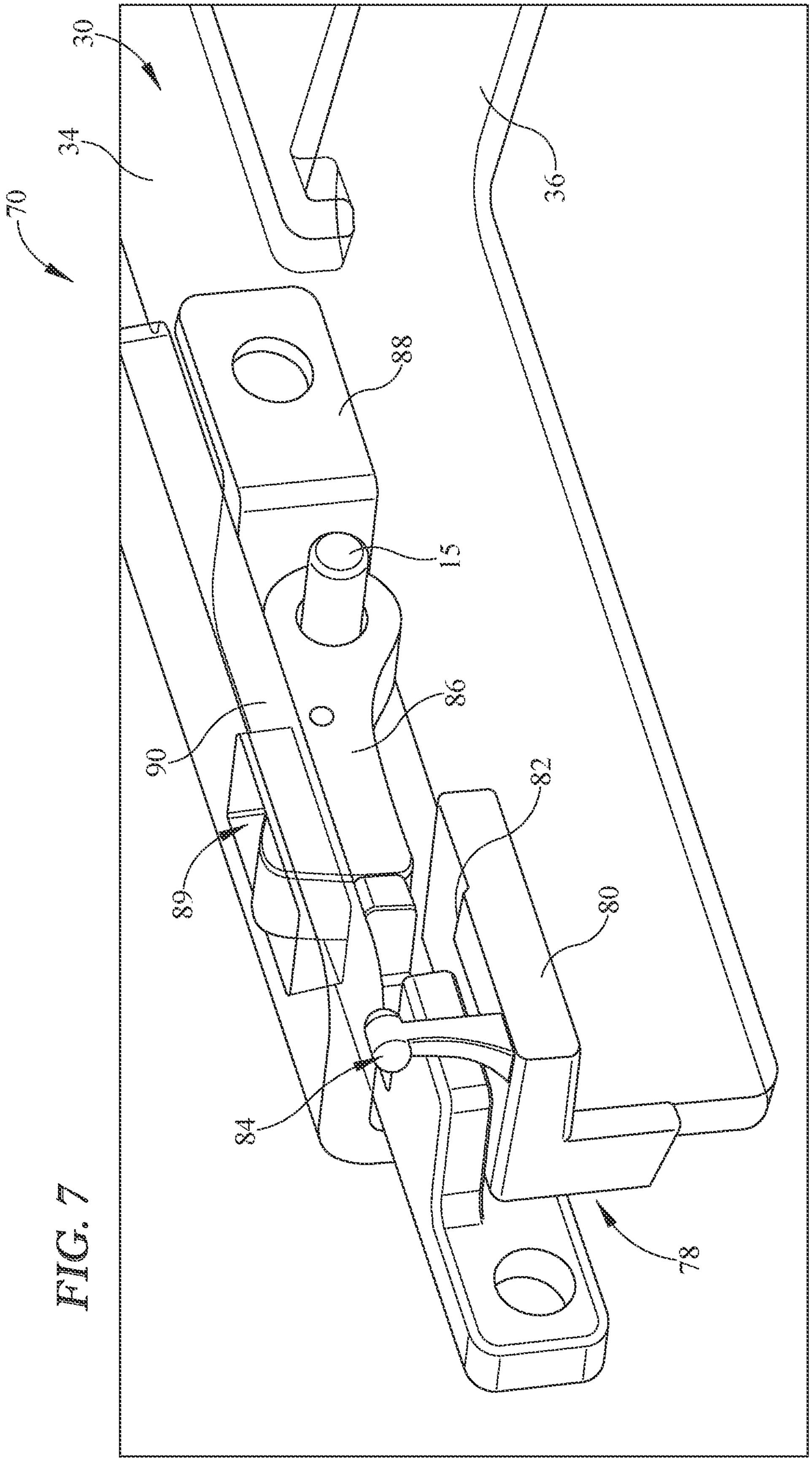
FIG. 7 is a perspective view of portions of the lock mechanism of FIGS. 5 and 6.

Referring to FIG. 7, a perspective view of portions of the latch operator 70 shows the slider 76 in the unrestricted position to release rotation of the lock key 86 out from the blocked position. However, in the blocked position, the lock key 86 is positioned with upward incline to extend into the opening 89 to block against movement of the latch 30 out from the locked position (leftward).

Returning to FIG. 2, a user may address the lock mechanism 16 while the latch 30 is in the locked position securing the door 14. The latch operator 70 is presently in a default restricted state in which the slider 78 is in the restricted position which maintains the lock key 86 in the blocked position, and thus restricts the latch 30 to the locked position. The user may operate the latch operator 70 to attain the unrestricted state. The user communicates via the user interface 38 to operate the latch operator 70, although as previously mentioned, the user may also operate the latch operator 70 wirelessly via mobile device. The user touches the user interface 38 with a predetermined series of touches (such as, but not limited to, long-short-short), and upon successful entry of the predetermined series of touches, the latch operator 70 is changed into the unrestricted state by operation of the driver 72 to move the slider 78 into the unrestricted position. The user interface may communicate successful entry of the predetermined series of touches to the user via flashes (such as, but not limited to, three short equally timed green flashes). The user may now engage the handle 36 and move the latch 30 into the unlocked position, driving the lock key 86 into the unblocked position. The driver 72 may default to bias the slider 78 towards the restricted position, for example, by timing out after 2 seconds from arrangement of the latch 30 in the unlocked position which may be detected via position sensor.

To operate the latch operator 70 via mobile device, the user may address the lock mechanism 16 while in a sleep mode and may touch the user interface 38 to awaken the lock mechanism 16 for connection with the personal mobile device 26. Once activated and connected with the mobile device 26, the lock application enables the activation button 28 (shown in FIG. 1) to move the slider 78 into the unrestricted position. The user may now move the latch 30 from the locked position into the unlocked position. The driver 72 may default to bias the slider 78 towards the restricted position, for example, by timing out after 2 seconds from arrangement of the latch 30 in the unlocked position which may be detected via position sensor.

Figure 8:
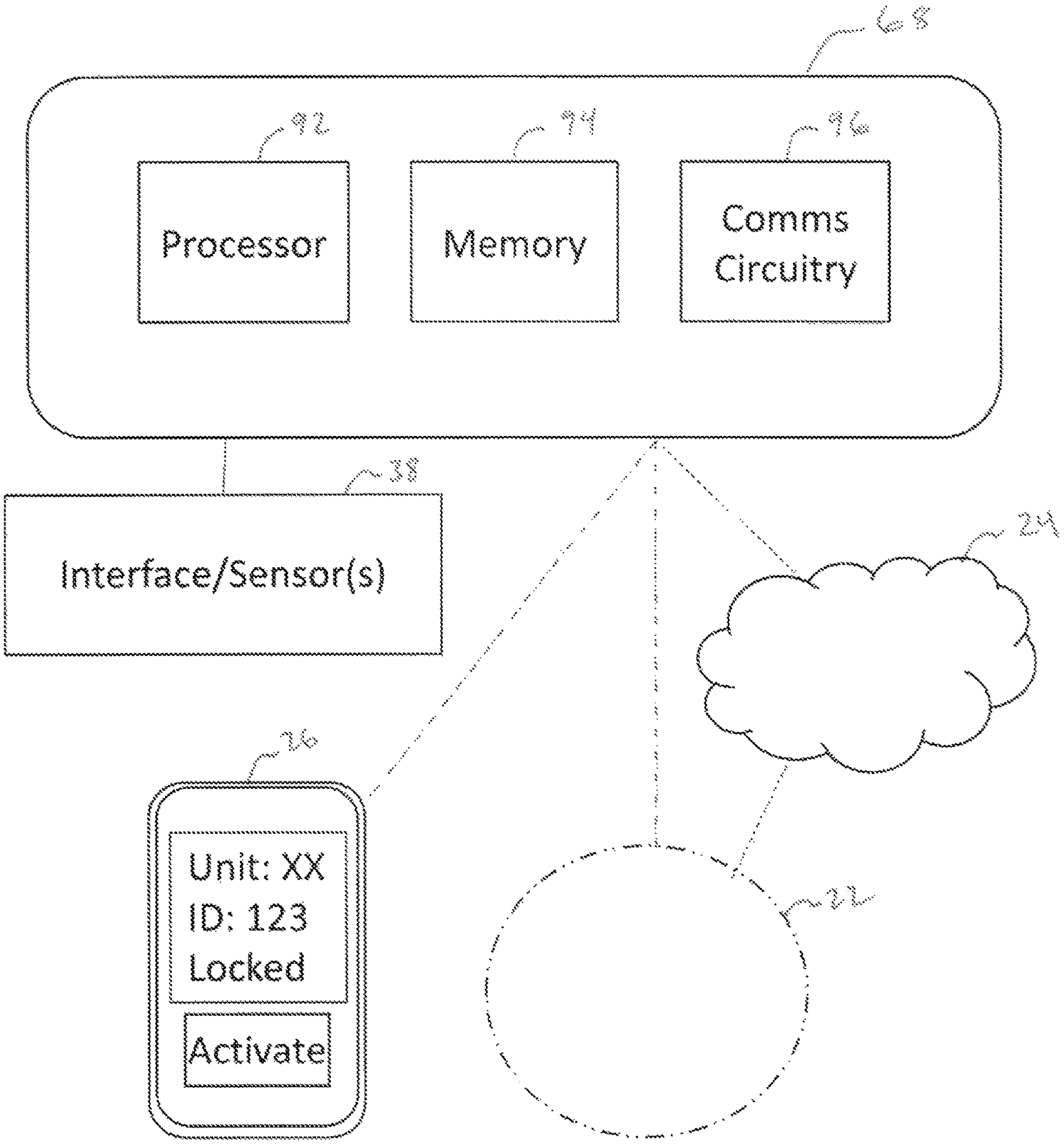
FIG. 8 is a diagrammatic view of a controller for governing operation of the lock mechanism.

Referring now to FIG. 8, a diagram of the controller 68 is shown. The controller 68 includes a processor 92 for executing instructions stored on a memory 94 to send commands and/or receive input via communications circuitry 96. The processor 92 is illustratively embodied as a microprocessor, but in some embodiments, may include any suitable computing device. The memory 94 is illustratively embodied as a flash memory, but in some embodiments, may include any suitable form of memory. The controller 68 is illustratively arranged in hardwired communication with the user interface 38 to receive user touch inputs, and with sensors of the lock mechanism, for example, position sensors indicating to the controller 68 position of any one or more of the latch 30, lock key 86, slider 78, and driver 72, although in some embodiments, such communications may be wireless; moreover motion sensors may be included to detect approach of a user and/or temperature sensors may be included to determine and/or or communication lock temperatures. The controller 68 is illustratively arranged in communication with one or more of personal mobile devices, one or more mesh networks of other lock mechanisms, and one or more remote network such as the internet, via the communications circuitry 96. The communications circuitry 96 is represented by a single element in FIG. 8, but represents any number of components suitable for wired and/or wireless communications via one or more communications protocols.

The lock mechanism 16 can enable overlock by the owner (lessor). The owner may communicate with individual lock mechanisms 16 to activate and/or deactivate user access. The owner may communicate with individual lock mechanisms 16 via the remote network, mesh network, or direct communication by a control interface platform such as an application interface of the computing device. By selecting, confirming, and/or entering identifying information on such an application interface regarding the particular lock mechanism 16, the owner can be presented with an activation button and/or deactivation button to toggle overlock controls between activated and deactivated states as desired. In the activated state, the overlock enables user access as discussed herein. In the activated state, the overlock can disable user access by disabling the user operation of the latch operator 70 via the personal mobile device 26 and/or user interface 38.

Devices, systems, and methods within the present disclosure may include an electromechanical locking device (lock) which can be attached to a roll-up door allowing tenants to secure their belongings without the need of a padlock. The lock may be opened via one or more of three methods: smart-device app (such as, but not limited to, via Bluetooth), wireless fob (such as, but not limited to, radio frequency), and/or quick-click code (such as, but not limited to, touch the user interface of the lock with a predetermined series of short and long presses). In illustrative embodiments, the lock may be opened via an attached keypad. The lock can also be used by the site-operator to overlock tenants, such as those tenants who don't make timely rent payments.

The lock may be battery-powered and may communicate via direct connection between lock and smart-device or via a wireless mesh network. In illustrative embodiments, the lock may be hard-wired for power and/or communication.

Traditional access control for locks, such as storage unit door locks, is generally hard-wired. Installing and/or maintaining such hardwired lock arrangements can be time and/or resource consuming process which can drive high expense. Other difficulties may arise in implementing wired solutions on existing facilities.

Devices, systems, and methods within the present disclosure may lessen the problems of traditional lock systems. For example, padlocks can be troublesome if users forget and/or lose keys. Padlocks can be subverted by cutting with bolt cutters. Moreover, traditional padlocks do not ordinary communicate remotes, for example, of their status with site operators. Traditional padlock-style overlocks can require separate and/or additional locks. Traditional locks attached to the building like normal access control systems can be difficult and/or expensive in installation, and/or can generally require opening each door at a site and/or at the same time because waiting for a unit to become vacated could require an installer to come to site one-at-a-time creating very high installation costs. Moreover, existing electronic overlocking devices on doors may lack networking (such as, but not limited to, mesh-enabled) so they can't easily report status to the site operator, and/or may not be designed for simple locking but only for overlocking.

Devices, systems, and methods within the present disclosure may be easily installed by removing (four) bolts on an existing hasp and replacing the hasp with this device using the exact same bolts and bolt pattern. Such arrangements can create a simple installation that anyone can perform, and/or can allow for rolling additions to the system as tenants move out. Such arrangements may provide both simple locking and/or overlocking operation by a solitary unit. Such arrangements may provide constant communication of its status, for example, via a two-way mesh network. Such communication can provide remote locking, remote unlocking, remote and/or automated overlocking, remote removal of overlock without ever involving a site employee, reporting of temperature of unit, motion detection inside and/or outside the unit using two discrete infrared sensors.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

What is claimed is:

1. A storage lock for a storage door, the storage lock comprising:

a lock housing for mounting to the storage door; and a lock mechanism arranged within the lock housing, the lock mechanism comprising:

a latch selectively operable to slide between a locked position in which the latch is extended from the lock housing to engage with a door frame supporting the storage door to block against opening of the storage door, and an unlocked position in which the latch is retracted relative to the lock housing to disengage from the door frame to allow the storage door to be opened for access to storage, and a latch control system including a latch operator including an electronic actuator, the latch operator selectively operable between a restricted state to block against operation of the latch out from the locked position, and an unrestricted state to permit operation of the latch out from the locked position, wherein the electronic actuator is operable to selectively block movement of the latch into the unlocked position for access control, wherein the latch control system is configured for overlocking including to activate overlock to disable operation of the latch operator into the unrestricted state in response to a request for overlocking to disable unlocking of the latch out from the locked position, wherein configuration for overlocking to disable operation of the latch operator into the unrestricted state includes blocking against unlocking operation of the electronic actuator for access control.

2. The storage lock of claim 1, wherein the latch control system includes a restrictor coupled with the electronic actuator for selective operation between restricted and unrestricted positions, wherein in the restricted position the restrictor is arranged to block movement of the latch out from the locked position.

3. The storage lock of claim 1, wherein the latch control system includes a processor executing instructions stored on memory and communications circuitry for conducting communications with the latch control system.

4. The storage lock of claim 3, wherein the latch control system is configured to receive the request for overlocking to disable unlocking of the latch as a remote request.

5. The storage lock of claim 4, wherein the latch control system is configured for communication for overlocking via a mesh network.

6. The storage lock of claim 4, wherein the latch control system is configured for communication for overlocking via the internet.

7. The storage lock of claim 3, wherein the latch control system is configured for communication with a mobile device in proximity therewith.

8. The storage lock of claim 7, wherein the latch control system is configured to receive an unlock request from the mobile device for prompting the latch control system into the unrestricted state to permit operation of the latch out from the locked position.

9. The storage lock of claim 8, wherein, in response to the request for overlocking to disable unlocking of the latch, the latch control system is configured to disable operation into the unrestricted state from the unlock request.

10. A self-storage door system, comprising a self-storage door assembly including a storage door and a door frame supporting the storage door, a storage lock assembly for selective locking of the self-storage door assembly to block against opening of the storage door, the storage lock assembly comprising:

a lock housing configured for mounting to the storage door; and a lock mechanism arranged within the lock housing, the lock mechanism comprising:

a latch selectively operable to slide between a locked position in which the latch is extended from the lock housing to engage with the door frame to block against opening of the storage door, and an unlocked position in which the latch is retracted relative to the lock housing to disengage from the door frame to allow the storage door to be opened for access to storage, and a latch control system including a latch operator including an electronic actuator, the latch operator selectively operable between a restricted state to block against operation of the latch out from the locked position, and an unrestricted state to permit operation of the latch out from the locked position, wherein the electronic actuator is operable to selectively block movement of the latch into the unlocked position for access control, wherein the latch control system is configured for overlocking including to activate overlock to disable operation of the latch operator into the unrestricted state in response to a request for overlocking to disable unlocking of the latch out from the locked position, wherein configuration for overlocking to disable operation of the latch operator into the unrestricted state includes blocking against unlocking operation of the electronic actuator for access control.

11. The self-storage door assembly of claim 10, wherein the latch control system includes a restrictor coupled with the electronic actuator for selective operation between restricted and unrestricted positions, wherein in the restricted position the restrictor is arranged to block movement of the latch out from the locked position.

12. The self-storage door assembly of claim 10, wherein the latch control system includes a processor executing instructions stored on memory and communications circuitry for conducting communications with the latch control system.

13. The self-storage door assembly of claim 12, wherein the latch control system is configured to receive the request for overlocking to disable unlocking of the latch as a remote request.

14. The self-storage door assembly of claim 13, wherein the latch control system is configured for communication for overlocking via a mesh network.

15. The self-storage door assembly of claim 13, wherein the latch control system is configured for communication for overlocking via the internet.

16. The self-storage door assembly of claim 12, wherein the latch control system is configured for communication with a mobile device in proximity therewith.

17. The self-storage door assembly of claim 16, wherein the latch control system is configured to receive an unlock request from the mobile device for prompting the latch control system into the unrestricted state to permit operation of the latch out from the locked position.

18. The self-storage door assembly of claim 17, wherein, the latch control system is configured, in response to the request for overlocking to disable unlocking of the latch, to disable operation into the unrestricted state from the unlock request.

19. The self-storage door assembly of claim 17, wherein, the latch control system is configured, in response to the request for overlocking to disable unlocking of the latch, to disable operation into the unrestricted state from an unlock request received via a local user interface of the storage lock assembly.

* * * * *